US011154054B2

(12) United States Patent
Zhang et al.

(10) Patent No.: US 11,154,054 B2
(45) Date of Patent: Oct. 26, 2021

(54) CELL RUPTURE-BASED ANTIMICROBIAL SURFACES COATED WITH METAL OXIDE NANO-ARRAYS

(71) Applicant: AGENCY FOR SCIENCE, TECHNOLOGY AND RESEARCH, Singapore (SG)

(72) Inventors: Yugen Zhang, Singapore (SG); Guangshun Yi, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 142 days.

(21) Appl. No.: 16/335,239

(22) PCT Filed: Sep. 19, 2017

(86) PCT No.: PCT/SG2017/050472
§ 371 (c)(1),
(2) Date: Mar. 20, 2019

(87) PCT Pub. No.: WO2018/056904
PCT Pub. Date: Mar. 29, 2018

(65) Prior Publication Data
US 2019/0246635 A1    Aug. 15, 2019

(30) Foreign Application Priority Data

Sep. 20, 2016  (SG) .............................. 10201607858

(51) Int. Cl.
*A01N 25/26* (2006.01)
*A01N 59/16* (2006.01)
(Continued)

(52) U.S. Cl.
CPC ............. *A01N 25/26* (2013.01); *A01N 59/16* (2013.01); *A01N 59/20* (2013.01); *C09D 5/14* (2013.01);
(Continued)

(58) Field of Classification Search
CPC .................................. A01N 25/26; C09D 7/67
See application file for complete search history.

(56) References Cited

U.S. PATENT DOCUMENTS 9,393,350 B2 * 7/2016 McGrath ............... A61L 29/085
2016/0115081 A1   4/2016 Cho
2016/0212989 A1 * 7/2016 Juodkazis ................ C12Q 1/24

FOREIGN PATENT DOCUMENTS

CN       103537197 A    1/2014
SG       10201601055 Y  12/2016
(Continued)

OTHER PUBLICATIONS

Dong, et al., "Hydrothermal growth of rutile TiO2 nanorod films on titanium substrates," Thin Solid Films, 2011; pp. 4634-4640, vol. 519, Elsevier.
(Continued)

*Primary Examiner* — Nathan T Leong
(74) *Attorney, Agent, or Firm* — Womble Bond Dickinson (US) LLP (57) ABSTRACT

The present disclosure relates to an antimicrobial coating on a surface, a method for preparing and uses of the same. In particular it relates to a process for preparing an antimicrobial coating on a surface, the process comprising the steps of: a) providing a surface; b) coating a metal oxide or a metal hydroxide on the surface in the presence of a solvent in a hydrothermal synthesis step to form a coated surface having a plurality of nanostructures; c) optionally drying the coated surface, wherein said nanostructure is preferably in nano-
(Continued)

(a)         (b)

(c)         (d)

pillar structure. The coating of the present application exhibits excellent antimicrobial activity against different types of microorganism, such as bacteria and yeast. The nanostructures are able to exert stress to the microorganism, and therefore controlling or killing them.

31 Claims, 11 Drawing Sheets

(51) Int. Cl.
    C09D 5/14      (2006.01)
    C09D 7/61      (2018.01)
    A01N 59/20    (2006.01)
    C09D 7/40      (2018.01)
    C09D 7/62      (2018.01)
    B82Y 30/00    (2011.01)
    C08K 3/22      (2006.01)
    C08K 3/20      (2006.01)

(52) U.S. Cl.
    CPC ............... *C09D 7/61* (2018.01); *C09D 7/62* (2018.01); *C09D 7/67* (2018.01); *C09D 7/68* (2018.01); *B82Y 30/00* (2013.01); *C08K 3/20* (2013.01); *C08K 3/22* (2013.01); *C08K 2003/2241* (2013.01); *C08K 2003/2248* (2013.01); *C08K 2003/2262* (2013.01); *C08K 2003/2272* (2013.01); *C08K 2003/2286* (2013.01); *C08K 2003/2293* (2013.01); *C08K 2003/2296* (2013.01)

(56) References Cited

FOREIGN PATENT DOCUMENTS

WO      2014109722 A1      7/2014
WO      2015/105460 A2    7/2015
WO    WO2015105460    *   7/2015

OTHER PUBLICATIONS

Ekthammathat, et al., "Antimicrobial activities of CuO films deposited on Cu foils by solution chemistry," Applied Surface Science, 2013 pp. 211-217, vol. 277, Elsevier.

Fan, et al., "immobilization of a Molecular Ruthenium Catalyst on Hematite Nanorod Arrays for Water Oxidation with Stable Photocurrent," ChemSusChem, 2015, pp. 3242-3247, vol. 8, Wiley-VCH Verlag GmbH & Co. KGaA, Weinheim.

Hafez, et al., "Assessment of Antibacterial Activity for Synthesized Zinc Oxide Nanorods Against Plant Pathogenic Strains," International Journal of Scientific & Technology Research, Sep. 2014, pp. 318-324, vol. 3, No. 9.

Hebeish, et al., "TiO2 nanowire and TiO2 nanowire doped Ag-PVP nanocomposite for antimicrobial and self-cleaning cotton textile," Carbohydrate Polymers, 2013, pp. 549-559, vol. 93, Elsevier.

Jaisai, et al., "Paper modified with ZnO nanorods—antimicrobial studies," Beilstein Journal of Nanotechnology, 2012, pp. 684-691, vol. 3.

Kim, et al., "Nanowire-integrated microfluidic devices for facile and reagent-free mechanical cell lysis," Lab Chip, 2012, pp. 2914-2921, vol. 12.

Liu, et al., "Growth of Oriented SIngle-Crystalline Rutile TiO2 Nanorods on Transparent Conducting Substrates for Dye-Sensitized Solar Cells," Journal of the American Chemical Society, 2009, pp. 3985-3990, vol. 131, American Chemical Society.

Okyay, et al,, "Antibacterial properties and mechanisms of toxicity of sonochernically grown ZnO nanorods," RSC Advances, 2015, pp. 2568-2575, vol. 5, The Royal Society of Chemistry.

Park, et al., "Nitrogen Monoxide Gas Sensing Properties of CuO Nanorods Synthesized by a Hydrothermal Method," Korean Journal of Materials Research, 2014, 6 pages, vol. 24, No. 1, Materials Research Society of Korea.

Rago, et al., "Zinc oxide microrods and nanorods: different antibacterial activity and their mode of action against Gram-positive bacteria," RCS Advances, 2014, pp. 56031-56040, vol. 4, The Royal Society of Chemistry.

Tam, et al., "Antibacterial activity of ZnO nanorods prepared by a hydrothermal method," Thin Solid Films, 2008, pp. 6167-6174, vol. 516, Elsevier.

The Extended European Search Report for Application No. 17853550.6 dated Jun. 21, 2019, 20 pages.

Wang, et al., "Development of novel implants with self-antibacterial performance through in-situ growth of 1D ZnO nanowire," Colloids and Surfaces B: Biointerfaces, 2016, pp. 623-633, vol. 141, Elsevier.

Bell et al., "Arming the enemy: the evolution of resistance to self-proteins" Microbiology, vol. 149, Jun. 2003 pp. 1367-1375.

Bergey et al. "Bergey's Manual of Systematic Bacteriology" Williams & Wilkins, 1st ed. vol. 1-4, 1984.

Berhe et al., "Influence of seeding and bath conditions in hydrothermal growth of very thin (~20nm) single-crystalline rutile TiO2 nanorod films" ACS Applied Materials & Interfaces, vol. 5, No. 4, Feb. 6, 2013, pp. 1181-1185.

Berndt et al., "Functional coatings for anti-biofouling applications by surface segregation of block copolymer additives" Polymer, vol. 51, No. 25, Nov. 26, 2010, pp. 5910-5920.

Diu et al., "Cicada-inspired cell-instructive nanopatterned arrays" Scientific Reports, vol. 4, No. 7122, Nov. 20, 2014, pp. 1-7.

Gao et al., "Recent advances in materials for extended-release antibiotic delivery system" The Journal of Antibiotics, vol. 64, Aug. 3, 2011, pp. 625-634.

Gerber et al., "Incorporating microorganisms into polymer layers provides bioinspired functional living materials" Proceedings of the National Academy of Sciences, vol. 109, No. 1, Jan. 3, 2012, pp. 90-94.

Hasan et al., "Selective bactericidal activity of nanopatterned superhydrophobic cicada *Psaltoda claripennis* wing surfaces" Applied Microbiology and Biotechnology, vol. 97, Dec. 19, 2012, pp. 9257-9262.

Hsu et al., "Light-activated covalent coating of cotton with bactericidal hydrophobic polycations" Biomacromolecules, vol. 12, No. 1, Dec. 3, 2010, pp. 6-9.

Ivanova et al., "Natural bactericidal surfaces: mechanical rapture of pseudomonas aeruginosa cells by cicada wings" Small, vol. 8, No. 16, Jun. 4, 2012, pp. 2489-2494.

Ivanova et al., "Bactericidal activity of black silicon" Nature Communications, vol. 4, No. 2838, Nov. 26, 2013, pp. 1-7.

Kim et al., "Nanostructured multifunctional surface with antireflective and antimicrobial characteristics" ACS Applied Materials & Interfaces, vol. 7, Jan. 5, 2015, pp. 326-331.

Komnatnyy et al., "Bacteria-triggered release of antimicrobial agents" Angewandte Chemie International Edition, vol. 53, No. 2, Nov. 29, 2013, pp. 439-441.

Kugel et al., "Antimicrobial coatings produced by 'tethering' biocides to the coating matrix: A comprehensive review" Progress in Organic Coatings, vol. 72, Issue 3, Sep. 1, 2011, pp. 222-252.

Lemire et al., "Antimicrobial activity of metals: mechanisms, molecular targets and applications" Nature Reviews Microbiology, vol. 11, May 13, 2013, pp. 371-384.

Lewis et al., "Surpassing nature: rational design of sterile-surface materials" Trends in Biotechnology, vol. 23, No. 7, Jul. 2005, pp. 343-348.

Li et al., "ZnO nanoneedle/H2O solid-liquid heterojunction-based self-powered ultraviolet detector" Nanoscale Research Letters, vol. 8, No. 415, Oct. 8, 2013, pp. 414-422.

Liu et al., "Growth of oriented single-crystalline rutile TiO2 nanorods on transparent conducting substrates for dye-sensitized solar cells" Journal of the American Chemical Society, vol. 131, No. 11, Feb. 26, 2009, pp. 3985-3990.

(56) References Cited

OTHER PUBLICATIONS

Nowlin et al., "Adhesion-dependent rupturing of *Saccharomyces cerevisiae* on biological anti-microbial nano-structured surfaces" Journal of the Royal Society Interface, vol. 12, Jan. 6, 2015, pp. 1-12.

Pham et al., "Nanotopography as a trigger for the microscale autogenous and passive lysis of erythrocytes" Journal of Materials Chemistry B, vol. 2, Issue 19, Mar. 14, 2014, pp. 2819-2826.

Pogodin et al., "Biophysical model of bacterial cell interactions with nanopatterned cicada wing surfaces" Biophysica Journal, vol. 104, No. 4, Feb. 19, 2013, pp. 835-840.

Sanz et al., "UV-black rutile TiO2: an antireflective photocatalytic nanostructure" Journal of Applied Physics, vol. 117, Issue 7, Feb. 20, 2015, pp. 074903-1-074903-8.

Sirelkhatim et al., "Review on zinc oxide nanoparticles: antibacterial activity and toxicity mechanism" Nano-Micro Letters, vol. 7, No. 3, Apr. 19, 2015, pp. 219-242.

Stuart et al., "Emerging applications of stimuli-responsive polymer materials" Nature Materials, vol. 9, Jan. 22, 2010, pp. 101-113.

Tiller et al., "Designing surfaces that kill bacteria on contact" Proceedings of the National Academy of Sciences, vol. 98, No. 11, May 22, 2001, pp. 5981-5985.

Wang et al., "A study on the antibacterial activity of one-dimensional ZnO nanowire arrays: effects of the orientation and plane surface" Chemical Communications, Issue 42, Dec. 2007, pp. 4419-4421.

Japanese Office Action for Japanese Application No. 2019-507848, dated Sep. 6, 2021, 15 pages.

Japanese Search Report for Japanese Application No. 2019-507848, dated Jul. 21, 2021, 33 pages.

\* cited by examiner

CELL RUPTURE-BASED ANTIMICROBIAL SURFACES COATED WITH METAL OXIDE NANO-ARRAYS

CROSS-REFERENCE TO RELATED APPLICATIONS

This patent application is a U.S. National Phase Application Under 35 U.S.C § 371 of International Application No. PCT/SG2017/050472, filed on Sep. 19, 2017, entitled "CELL RUPTURE-BASED ANTIMICROBIAL SURFACES COATED WITH METAL OXIDE NANO-ARRAYS," which claims the benefit of priority of Singapore Patent Application No. 10201607858V, filed on Sep. 20, 2016.

TECHNICAL FIELD

The present invention generally relates to surfaces which are covered with a metal oxide and the said surface able to exhibit antimicrobial properties. The present invention also relates to a method of preparing the same.

BACKGROUND ART

Infectious diseases and drug resistance have posed serious threat to our public health. Cross-infection via the frequently touched surfaces is one of the main causes of infectious diseases. Organic biocide chemicals or disinfectants have been commonly used to kill bacteria on surfaces. The chemicals have also been grafted or coated on surfaces for antimicrobial purposes. However, the organic biocides and the modified surfaces have critical issues such as growing drug resistance to the microbicide agents, low microbial killing efficacy, toxic residuals and poor long-term stability. Fabrication of antimicrobial surfaces with long-term stability and activity is an important approach to control infectious diseases which remains a challenging task.

Recently, it is reported that surface nano-wires and nano-protrusions can pierce through the cell membranes of attached cells. The bactericidal property of the nano-pillar arrays on the cicada wing surface has also been reported. It is purely a physical interaction between cells and the nanopatterns on the cicada wings which results in cell deformation and massive lysis without the need for additional application of chemicals. Importantly, bactericidal property is also observed for synthetic nano-patterns of black silicon, and on titanium, zinc and copper surfaces. This new discovery opens up a great opportunity for the development of innovative microbicide surface technologies which are clean and safe, requires no external chemicals and have no resistance issue. As the surface nano-structures are made of inorganic materials, they potentially have improved long-term stability and activity. However, there are no existing technologies that can create suitable cell-instructive nano-array surfaces in an efficient and simple way. Currently, there are only very limited materials and nano-topographies which have been studied for their bactericidal properties. The "top-down" approaches (such as reactive-ion beam etching and hydrothermal etching methods) currently used for fabricating surface nano-patterns are sophisticated, expensive, and rely highly on the specific materials. Gas phase deposition method is also used to prepare the surface nano-structures; however, this method is similarly expensive and proves difficult to scale up.

Therefore there is a need to develop a simple and scalable method to prepare or to coat the biocidal nanostructures on commonly used surfaces.

SUMMARY OF INVENTION

In one aspect, there is provided a process for preparing an antimicrobial coating on a surface, the process comprising the steps of:
a) providing a surface;
b) coating a metal oxide or a metal hydroxide on the surface in the presence of a solvent in a hydrothermal synthesis step to form a coated surface having a plurality of nanostructures;
c) optionally drying the coated surface.

In another aspect, there is provided a use of a coated surface obtained in the process described herein as an antimicrobial material.

In another aspect, there is provided an antimicrobial material comprising the surface obtained by the process described herein.

The inventors have surprisingly found that the process defined herein is advantageously suitable for preparing surfaces which are coated with metal oxides that have antimicrobial properties. In particular, the process relates to coating a metal oxide or a metal hydroxide on the surface using a hydrothermal synthesis step and optionally drying and/or heating the surface to obtain the coated surface. The surface that can be employed in the process is selected from the group comprising a glass, a polymer, a plastic, a ceramic, a silicon wafer or a metal. Further, the metal oxide that can be used in the present invention comprises an oxide of a transition metal, preferably selected from the group comprising $ZnO$, $TiO_2$, $Fe_2O_3$, $Ag_2O$, $CuO$, $NiO$, $Au_2O_3$ and $MnO_2$. The metal hydroxide which can be used in the present invention comprises a hydroxide of a transition metal.

Advantageously the method according to the invention allows for coating metal oxide nano-patterns on various surfaces with bactericidal properties. Different types of metal oxides (such as $ZnO$, $TiO_2$, $Fe_2O_3$ or $FeOOH$) can be coated on various surfaces (such as glass, polymer, plastic and metal) with designed nano-structures. The nanostructured surfaces according to the invention have excellent stability and bactericidal activity. Different from traditional chemical-grafted antibacterial surfaces, the metal oxide nano-array coatings kill bacterial based on rupturing cell membranes. The method according to the invention provides an alternative strategy for preparing antibacterial surfaces.

Advantageously, the nanostructured metal oxide coating on the surface kills more than 99% of the bacteria when contacted. Accordingly, the metal oxide coating kills the bacteria by rupturing cell membranes. The nanostructures of the metal oxide coating on the surface are most preferably in the shape of nanopillars.

The easiest process to grow nanopillars on a surface is via a solution process, wherein a surface is placed in the growing solution under hydrothermal conditions and the metal oxide nanopillars are formed on the surface. The key to growing nanopillars is by adjusting the solution components to allow only one direction of pillars to grow and to suppress the growing of other directions of the metal oxide.

Accordingly, the inventors have found a process for the preparation of an antimicrobial coating of a nanostructured metal oxide on a surface as disclosed above, wherein the coated surface finds several applications in biomedicine, pharmaceuticals and cosmetics.

Definitions

The following words and terms used herein shall have the meanings indicated:

The expression "nanopillars" refers to pillar shaped nanostructures that may be grouped together in lattice like arrays. Each nanopillar may have a pillar shape at the bottom and a tapered pointy end at the top.

The expression "ceramic" refers to an inorganic, non-metallic, solid material comprising metal, non-metal or metalloid atoms held together primarily by ionic bonds, covalent bonds or a mixture of both.

The expression "hydrothermal synthesis" or "hydrothermal conditions" refers to a synthesis reaction or synthesis conditions of high-temperature aqueous solutions in a closed container, maybe at high vapor pressures.

The word "substantially" does not exclude "completely", e.g., a composition which is "substantially free" from Y may be completely free from Y. Where necessary, the word "substantially" may be omitted from the definition of the invention.

Unless specified otherwise, the terms "comprising", "comprise" and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a process for preparing an antimicrobial coating on a surface will now be disclosed.

In one aspect, there is provided a process for preparing an antimicrobial coating on a surface, the process comprising the steps of:

a) providing a surface;
b) coating a metal oxide or a metal hydroxide on the surface in the presence of a solvent in a hydrothermal synthesis step to form a coated surface having a plurality of nanostructures;
c) optionally drying the coated surface.

In the process step a) disclosed herein, the surface which is used for preparing the antimicrobial surface may be selected from the group comprising a glass, a polymer, a plastic, a ceramic, a silicon wafer, a metal or a mixture thereof. Glass covered with a transparent conductive film such as fluorine-doped tin oxide (FTO) and tin-doped indium oxide (ITO) or conductive metal surfaces may be particularly mentioned. Polymers may be selected from the group comprising polycarbonates, poly methyl methacrylates (PMMA), polytetrafluoroethylene (Teflon), polystyrene, polyvinyl chloride, polypropylene or mixtures thereof. The metal may be selected from the group comprising tin, zinc, iron, stainless steel or mixtures thereof.

The coating for the surface may be an oxide. The oxide may be an oxide of an element or elements selected from Group 2, Group 4, Group 7, Group 8, Group 10, Group 11, Group 12 or Group 13 of the Periodic Table of Elements. The element may be a transition metal or a non-transition metal or a mixture of both. In one embodiment, the metal oxide may be selected from the group comprising MgO, $Al_2O_3$, ZnO, $TiO_2$, $Fe_2O_3$, $Ag_2O$, CuO, NiO, $Au_2O_3$, $MnO_2$ or a mixture thereof.

Alternatively, the coating for the surface may be a hydroxide. The hydroxide may be a hydroxide of an element selected from Group 2, Group 4, Group 7, Group 8, Group 10, Group 11, Group 12 or Group 13 of the Periodic Table of Elements. In one embodiment, the metal hydroxide is FeOOH. The hydroxide may be produced under hydrothermal conditions from the salts of the metal hydroxide, such as carbonates, bicarbonates, chlorides, sulphates, phosphates, nitrates or any derivatives of these salts, optionally in the presence of alkali salts such as alkaline sulphates, alkaline carbonates and alkaline bicarbonates.

In the process disclosed herein, the metal hydroxide coating on the surface may be converted to a metal oxide in a drying step. In one embodiment, the FeOOH coating on the surface is converted to $Fe_2O_3$ in a drying step.

Prior to coating a metal oxide or a metal hydroxide on the surface in the process described herein, the surface may be washed with a polar solvent selected from the group comprising isopropanol, water, acetone, ethanol, tert butanol, dimethylsulfoxide (DMSO), dimethyl formamide (DMF), acetic acid or any of the mixture thereof. A mixture of isopropanol/water/acetone may be particularly mentioned. The solvent mixture may be used in ratios of about 0.5-1.5/0.5-1.5/0.5-1.5, preferably about 0.7-1.3/0.7-1.7/0.7-1.7, preferably about 0.9-1.9/0.9-1.9/0.9-1.9 and most preferably 1/1/1. The solvent mixture may consist of any of the polar solvents described herein and a mixture of solvents may consist of 2, 3, 4, 5, 6, 7 or 8 of the solvents described herein in any proportion. In one embodiment, the surface is washed with water, prior to coating a metal oxide or a metal hydroxide on the surface.

In the process disclosed herein, the drying step may comprise heating the coated surface in air at a temperature between 300° C. and 1000° C., between 320° C. and 900° C., between 330° C. and 800° C., between 340° C. and 700° C., between 350° C. and 600° C., between 300° C. and 500° C., between 310° C. and 400° C., between 400° C. and 1000° C., between 410° C. and 900° C., between 420° C. and 800° C., between 430° C. and 700° C., between 400° C.

and 600° C., between 400° C. and 500° C., between 500° C. and 1000° C., between 500° C. and 900° C., between 500° C. and 800° C., between 500° C. and 720° C., between 500° C. and 600° C., between 600° C. and 1000° C., between 600° C. and 900° C., between 600° C. and 800° C. or between 600° C. and 710° C.

In the process disclosed herein, a seed coating of a metal oxide may be formed on the surface prior to the hydrothermal process by coating a metal oxide sol on the surface. In one embodiment, the metal oxide sol coating on the surface may be dried by heating at a temperature of 200° C., 300° C., 400° C., 500° C., 600° C., 700° C., 800° C., 900° C. or 1000° C.

The preparation of the surface coating with a metal oxide sol comprises a step of placing the surface in a solution containing the metal oxide. Accordingly step a) may include another process step in which the surface is pre-coated with an oxide of an element selected from Group 2, Group 4, Group 7, Group 8, Group 10, Group 11, Group 12 or Group 13 of the Periodic Table of Elements, preferably MgO, $Al_2O_3$, ZnO, $TiO_2$, $Fe_2O_3$, $Ag_2O$, CuO, NiO, $Au_2O_3$, $MnO_2$. Such pre-coating may be the basis for the nanostructured metal oxide coated thereon according to step b). The pre-coating is preferably done by formation from a sol of the metal oxide. The metal oxide sol solution for pre-coating may be prepared by mixing a metal salt of the corresponding metal oxide to be coated on a surface in a polar solvent. For instance, if the metal oxide to be coated on a surface is zinc oxide, the sol solution should be prepared using a zinc salt. The metal salt may be selected from the group comprising a hydroxide, a carbonate, an acetate, a phosphate, a nitrate, a sulphate, a bicarbonate, a citrate, a chloride or any derivatives of these salts. In one embodiment, the metal salt may contain water of crystallization. In one embodiment, the salt used may be $Zn(OAc)_2.2H_2O$. The concentration of the metal salt in the sol solution may be about 0.60 mol/dm$^3$, 0.65 mol/dm$^3$, 0.70 mol/dm$^3$, 0.75 mol/dm$^3$, 0.80 mol/dm$^3$, 0.85 mol/dm$^3$, 0.90 mol/dm$^3$, 0.95 mol/dm$^3$, 1.00 mol/dm$^3$, 1.10 mol/dm$^3$, 1.20 mol/dm$^3$, 1.40 mol/dm$^3$, 1.50 mol/dm$^3$ or 1.80 mol/dm$^3$, In one embodiment, the concentration of the metal salt in the sol solution is about 0.75 mol/dm$^3$.

The solvent used for preparing the sol solution may be selected from the group comprising 2-methoxyethanol, isopropanol, water, acetone, ethanol, tert butanol, dimethylsulfoxide (DMSO), dimethyl formamide (DMF), acetic acid or any of the mixture thereof. In one embodiment, the solvent used may be 2-methoxyethanol. An organic base may be added in the preparation of the sol solution. The base may be selected from the group comprising methyl amine, ethyl amine, tert-butyl amine, mono-ethanol amine, di-ethanol amine, tri-ethanol amine, 1,2-diaminoethane, amino phenol, di-amino phenol, imidazole, guanidine or any of the mixtures thereof. In one embodiment, the base used may be mono-ethanol amine.

The sol solution comprising a mixture of the metal salt and the organic base in the solvent may be agitated or stirred with or without heating to aid dissolution. The solution may be agitated or stirred at 50° C., 55° C., 60° C., 65° C., 70° C., 75° C., 80° C., 85° C., 90° C. or 95° C. In one embodiment, the solution is stirred at 60° C. to aid dissolution to obtain a clear homogeneous solution. The sol solution may be prepared and used instantly for applying onto the surface or it may be kept in a freezer at 4° C., −5° C., −20° C., −30° C. or −50° C. for use thereafter. In one embodiment, the solution may be kept in a 4° C. freezer and served as a coating solution.

The hydrothermal synthesis step may be carried out at a temperature between 50° C. and 300° C., between 60° C. and 260° C., between 70° C. and 220° C., between 75° C. and 180° C., between 75° C. and 120° C., between 80° C. and 300° C., between 80° C. and 260° C., between 80° C. and 220° C., between 80° C. and 180° C., between 80° C. and 120° C., between 100° C. and 300° C., between 100° C. and 260° C., between 100° C. and 220° C., between 100° C. and 190° C., or between 100° C. and 130° C.

In one embodiment of the process described herein, the hydrothermal synthesis is performed from a dilute aqueous metal nitrate solution and hexamethylenetetramine (HMT). Metal nanorods grown by this method have the wurtzite structure (zincite). Other modifiers may be added in addition to the metal nitrate and HMT disclosed herein, however, HMT and preferably zinc nitrate are particularly mentioned. Other modifiers include sodium citrate and diaminopropane; other chemicals to control pH include NaOH, diaminopropane and diethylenetriamine.

In one embodiment of the process described herein, a metal alkoxide may be reacted under hydrothermal conditions with an acid, such as a mineral acid, e.g. hydrochloric acid. The metal alkoxide may particularly include titanium ethoxide, titanium isopropoxide, titanium t-butoxide, n-dibutyldiacetyl tin, n-butyl lithium, sec-butyl lithium and the like, or an alcohol solution thereof.

In one embodiment of the process described herein, the coated surface obtained after the hydrothermal synthesis step may be rinsed extensively with deionized water before drying. The drying of the coated surface may be carried out under ambient conditions. In one embodiment, the process may further comprise a step of heating the coated surface, said heating step being carried out at a temperature between 300° C. and 1000° C., between 310° C. and 900° C., between 320° C. and 800° C., between 330° C. and 700° C., between 340° C. and 600° C., between 300° C. and 500° C., between 300° C. and 400° C., between 400° C. and 1000° C., between 400° C. and 900° C., between 400° C. and 800° C., between 400° C. and 700° C., between 400° C. and 600° C., between 400° C. and 500° C., between 500° C. and 1000° C., between 500° C. and 900° C., between 500° C. and 800° C., between 500° C. and 700° C., between 500° C. and 600° C., between 600° C. and 1000° C., between 600° C. and 920° C., between 600° C. and 810° C. or between 600° C. and 720° C.

The metal oxide layer on the surface may have a thickness selected from between 1 nm to 10000 nm, between 2 nm to 5000 nm, between 1 nm to 2000 nm, between 3 nm to 800 nm, between 5 nm to 600 nm, between 1 nm to 500 nm, between 100 nm to 10000 nm, between 120 nm to 5000 nm, between 100 nm to 2000 nm, between 100 nm to 800 nm, between 100 nm to 600 nm, between 100 nm to 500 nm, between 150 nm to 10000 nm, between 150 nm to 5000 nm, between 150 nm to 2000 nm, between 150 nm to 800 nm, between 150 nm to 600 nm, between 150 nm to 500 nm, between 200 nm to 10000 nm, between 200 nm to 5000 nm, between 200 nm to 2500 nm, between 200 nm to 800 nm, between 200 nm to 600 nm or between 200 nm to 500 nm.

In the process described herein, the hydrothermal synthesis step may be performed in a reaction time between 1 h to 24 h, between 2 h to 24 h, between 3 h to 24 h, between 4 h to 24 h, between 1 h to 21 h, between 2 h to 22 h, between 3 h to 23 h, between 4 h to 20 h, between 4 h to 24 h, between 4 h to 21 h, between 4 h to 18 h or between 4 h to 18 h.

In one embodiment, the metal oxide nanostructures may be in the form of nanopillars, nanorods, nanocones, nanocubes, nanodots, nanoneedles or a mixture of any of the forms described therein. An exemplary form of the structure of the metal oxide layer on the surface is in the form of nanopillars.

In one embodiment, the nanostructures may extend between 1 nm to 10000 nm, between 1 nm to 5000 nm, between 1 nm to 2000 nm, between 2 nm to 800 nm, between 3 nm to 600 nm, between 1 nm to 500 nm, between 100 nm to 10000 nm, between 100 nm to 5000 nm, between 100 nm to 2000 nm, between 100 nm to 800 nm, between 100 nm to 600 nm, between 100 nm to 500 nm, between 150 nm to 10000 nm, between 150 nm to 5000 nm, between 150 nm to 2000 nm, between 150 nm to 800 nm, between 150 nm to 600 nm, between 150 nm to 500 nm, between 200 nm to 10000 nm, between 200 nm to 5000 nm, between 200 nm to 2000 nm, between 200 nm to 800 nm, between 200 nm to 600 nm or between 200 nm to 500 nm from the surface. In another embodiment, the nanostructures are preferably nanopillars, Microorganisms can be controlled by the materials in a variety of media by contacting an effective amount of the antimicrobial material with a microorganism in the medium. A convenient medium is an aqueous medium. The antimicrobial material of the present invention controls a broad spectrum of microorganisms. The material has been found to be especially useful in controlling bacteria. The term "bacteria" is meant to include eubacteria and archaebacteria. Eubacteria include fermicutes, gracilicutes and ternicutes. Gracilicutes include gram-negative, facultatively anaerobic rods. Gram-negative, facultatively anaerobic rods include Enterobacteriaceae. Enterobacteriaceae include *Klebsiella* and *Escherichia*. *Klebsiella* include *Klebsiella pneumoniae* and *Escherichia* include *Escherichia coli*. Fermicutes include the group gram-positive cocci, and the group endospore-forming rods and cocci. Gram-positive cocci include Micrococcaceae. Micrococcaceae include *Staphylococcus* and *Staphylococcus* includes *Staphylococcus aureus*. Endospore-forming rods and cocci include Bacillaceae. Bacillaceae includes which includes *Bacillus circulans*. All references herein to bacteria are in accordance with Bergey's Manual of Systematic Bacteriology, Williams & Wilkens, 1st ed. Vol. 1-4, (1984). *E. Coli* (EC), *Salmonella, Listeria monocytogenes, P. aerugirosa* (PA), *S. aureus* (SA), and *C. albicans* (CA) may be particularly mentioned.

BRIEF DESCRIPTION OF DRAWINGS

The accompanying drawings illustrate one or more disclosed embodiments and serves to explain the principles of the present invention. It is to be understood, however, that the drawings are designed for purposes of illustration only, and not as a definition of the limits of the invention.

EXAMPLES

Non-limiting examples of the invention and a comparative example will be further described in greater detail by reference to specific Examples, which should not be construed as in any way limiting the scope of the invention.

Example 1—Preparation of FeOOH Nanopillars on Various Surfaces

An aqueous solution of 0.946 g $FeCl_3.6H_2O$ and 0.479 g $Na_2SO_4$ in 70 ml water was put into a 100 ml hydrothermal reactor. Following the washing of the substrate surface [glass, FTO glass (fluorine doped tin oxide glass), tin-plated steel and Teflon] with a solution of isopropanol/water/acetone (1:1:1), the respective surface was put into the hydrothermal reactor with the growing surface facing down. The reactor was heated to 100° C. for a period of time ranging from 6-24 h. Yellowish FeOOH nanopillars were formed on the surface. The surface was washed with deionized water and dried in ambient air.

Figure 1:
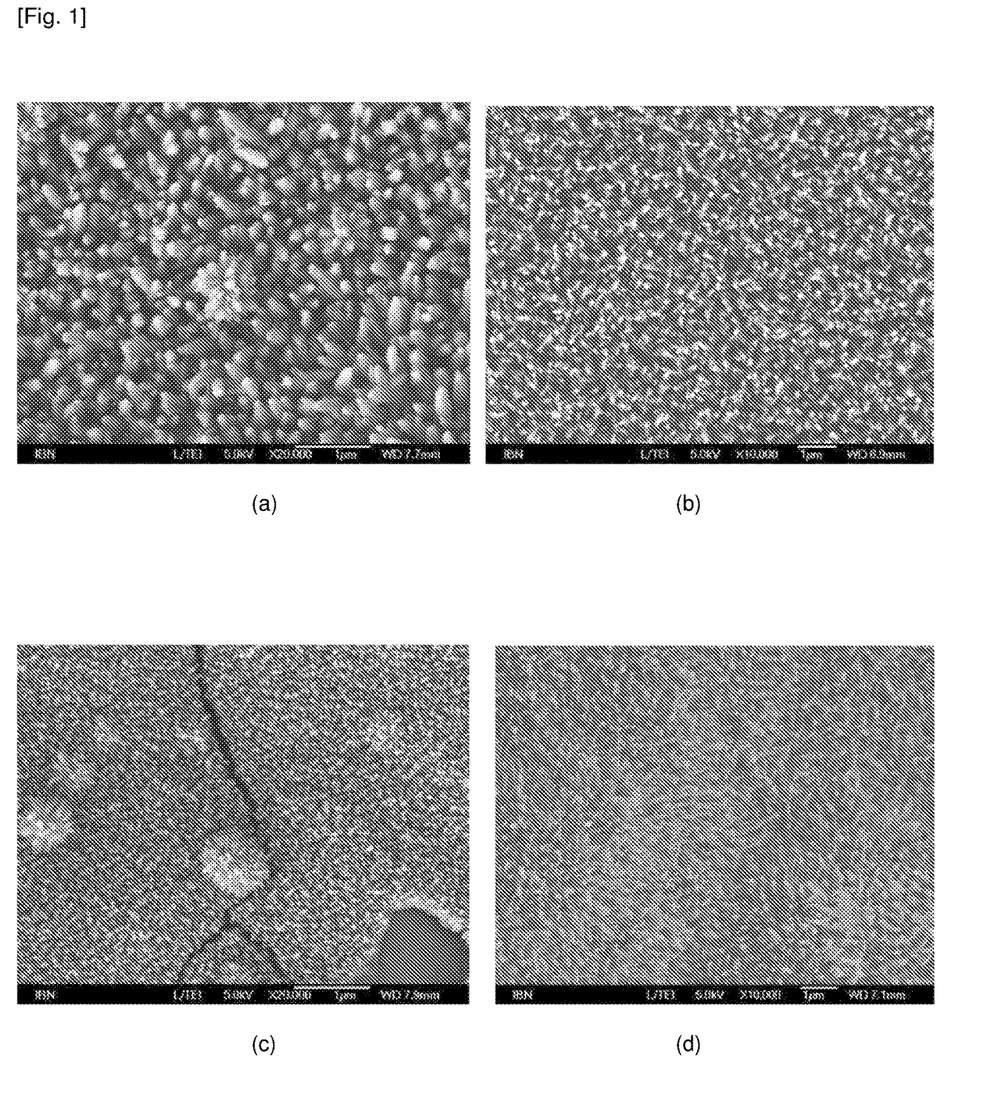
FIG. 1 contains Scanning Electron Microscopy (SEM) images showing FeOOH nanopillars on various substrates: (a) tin-plated steel, (b) glass, (c) polystyrene and (d) Teflon.

The growing of FeOOH on FTO glass has been reported and used as a photoanode for water splitting reaction. In the present disclosure, FeOOH nanopillars were fabricated on various substrates and their SEM images are shown in FIG. 1. The length of the FeOOH nanopillars can be tuned from 200 nm to 500 nm which is comparable to the nanopillars on the cicada wings (P. claripennis~200 nm) and on the dragonfly wings (D. bipunctata~240 nm) and black silicon~500 nm demonstrating bactericidal activities due to the physical structures of the nanopillars.

Figure 2:
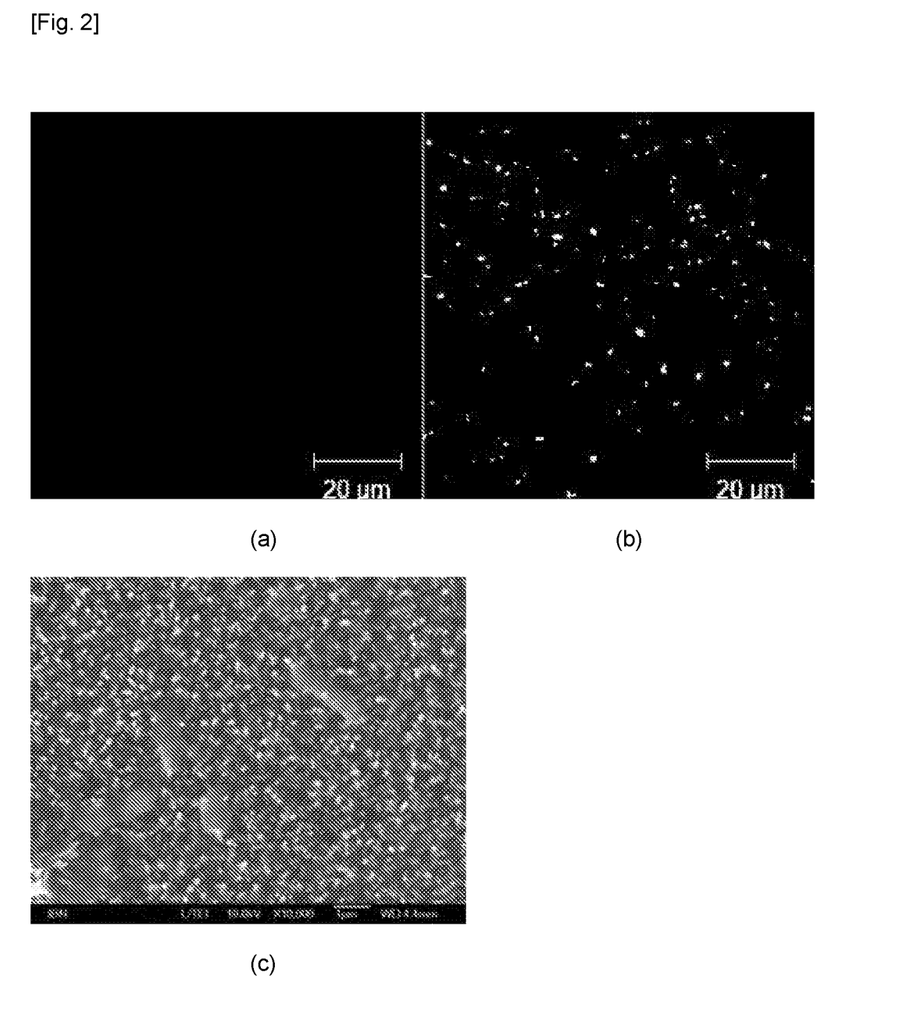
FIG. 2 illustrates the antibacterial property of FeOOH nanopillars on glass surface against *P. aerugirosa*: fluorescent microscope images of (a) dead bacteria, (b) live bacteria on the glass surface and (c) SEM image of bacteria on the FeOOH nanopillars surface.

The antibacterial property of the nanopillars on glass surface has been evaluated using LIVE/DEAD assay and SEM. *P. aerugirosa* (PA) was used as the testing bacteria. It is reported that PA can be killed by cicada wings and dragonfly wings. FIGS. 2a and 2b represent the dead and the live bacteria respectively. It is shown that 75% of bacteria was killed indicating the antibacterial properties of the surface. The SEM image in FIG. 2c further confirmed the killing of the bacteria was due to the rupturing effect. Bacteria were pierced by the pillar through the cell body.

Example 2—Preparation of $Fe_2O_3$ Nanopillars on Various Surfaces

To convert FeOOH into $Fe_2O_3$ nanopillars, the FTO glass and tin-plated steel surfaces that were coated with FeOOH nanopillars were placed into a furnace and heated to 500-

800° C. The yellowish FeOOH nanopillars on the surface were converted to red $Fe_2O_3$ nanopillars. There is no change in the original structures of FeOOH.

Figure 3:
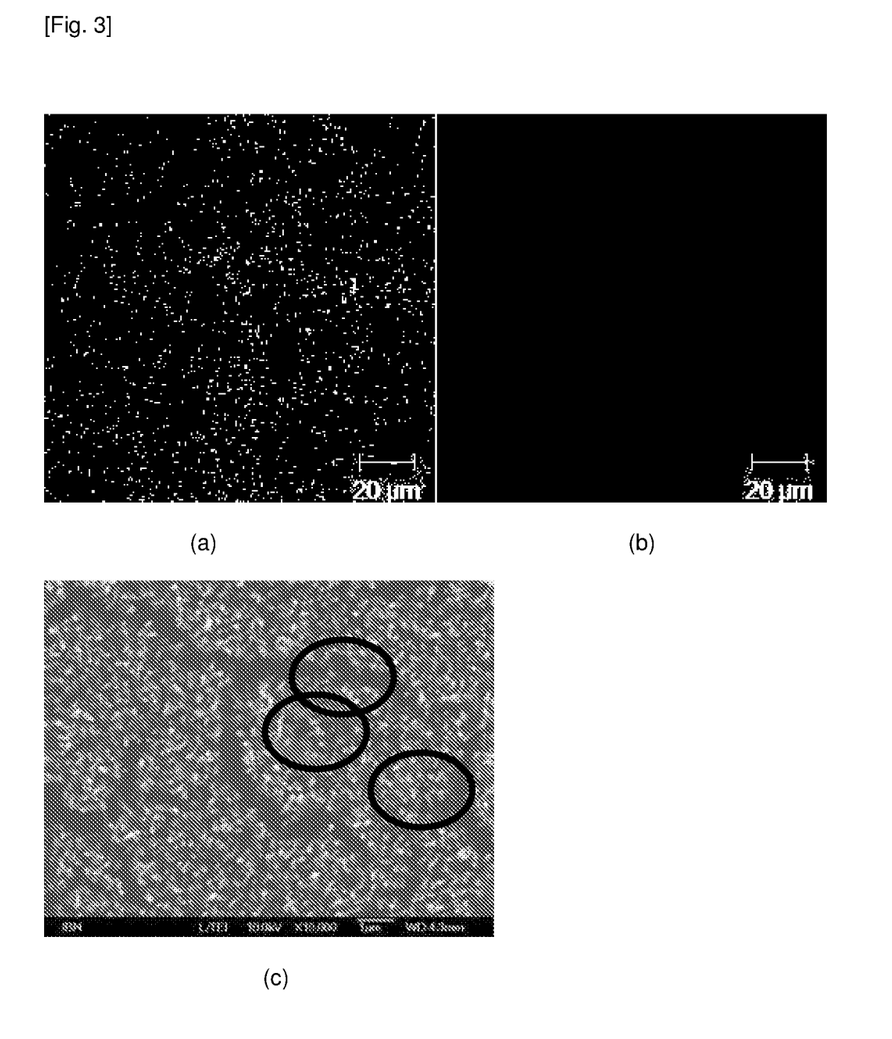
FIG. 3 illustrates the antibacterial property of $Fe_2O_3$ nanopillars on glass surface against *P. aerugirosa*: fluorescent microscope images of (a) dead bacteria, (b) live bacteria on the glass surface and (c) SEM image of bacteria on the $Fe_2O_3$ nanopillars surface.
Figure 4:
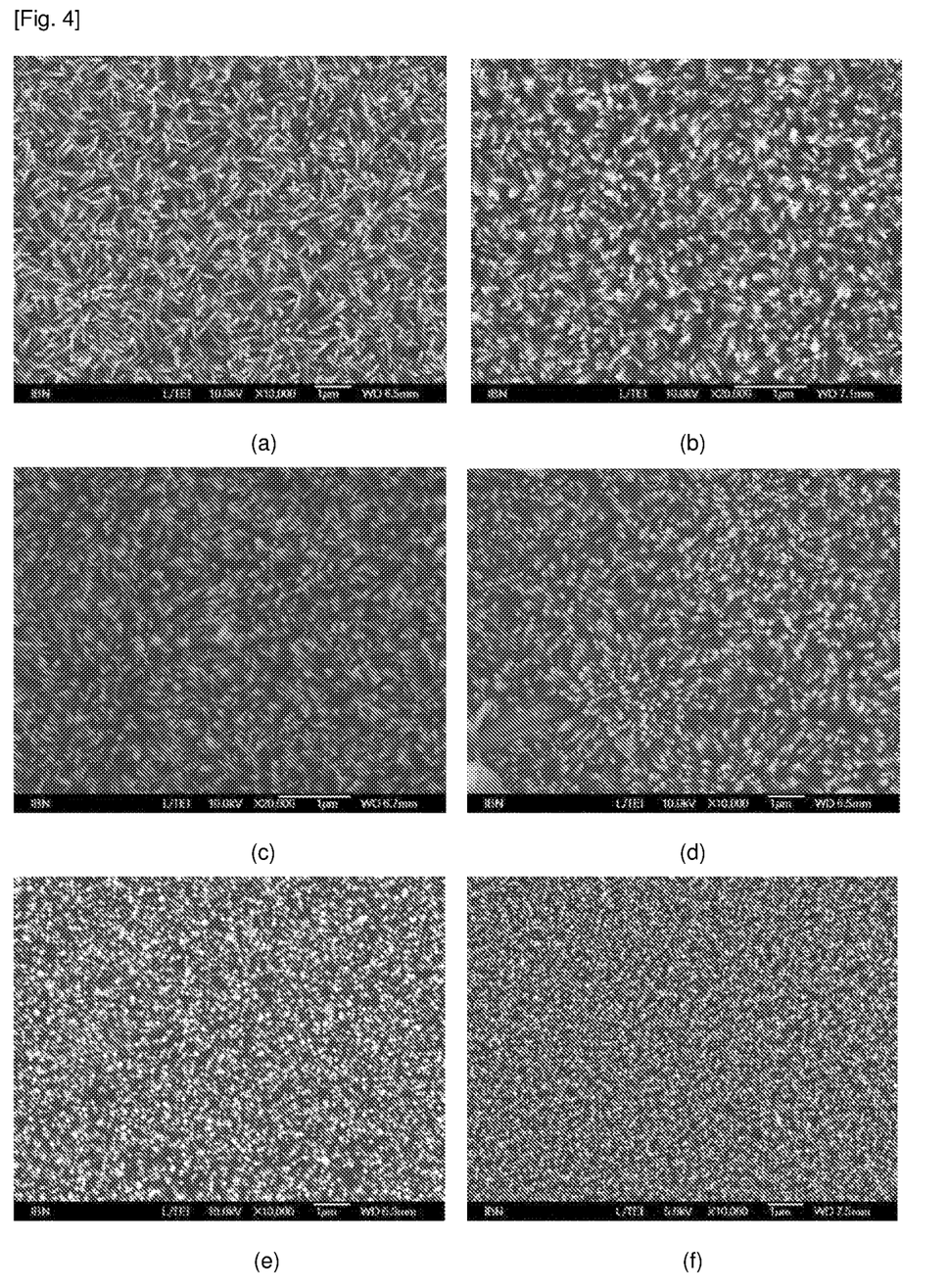
FIG. 4 contains SEM images showing ZnO nanopillars on various substrates: (a) glass, (b) silicon wafer, (c) stainless steel, (d) ceramics, (e) PMMA, and (f) titanium.
Figure 5:
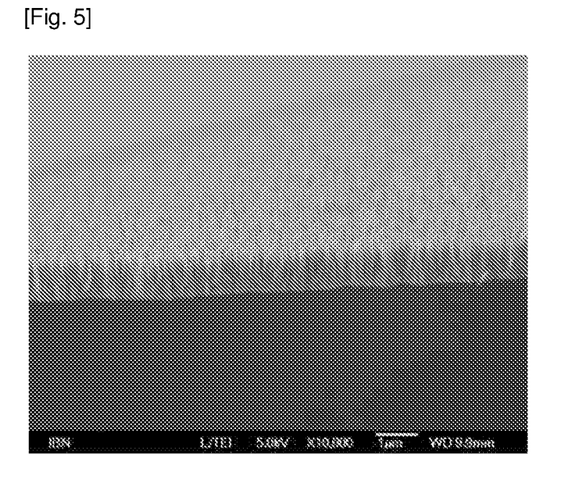
FIG. 5 is a SEM image showing the sideview of the ZnO nanopillars on titanium.
Figure 6:
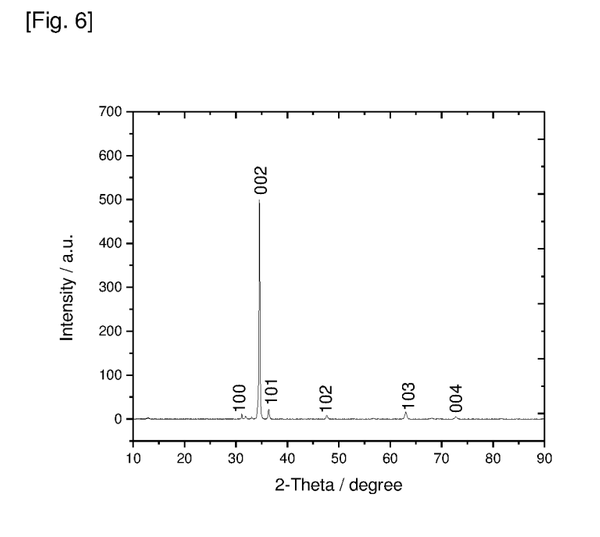
FIG. 6 shows a X-ray diffraction pattern (XRD) of the ZnO nanopillars on glass.
Figure 7:
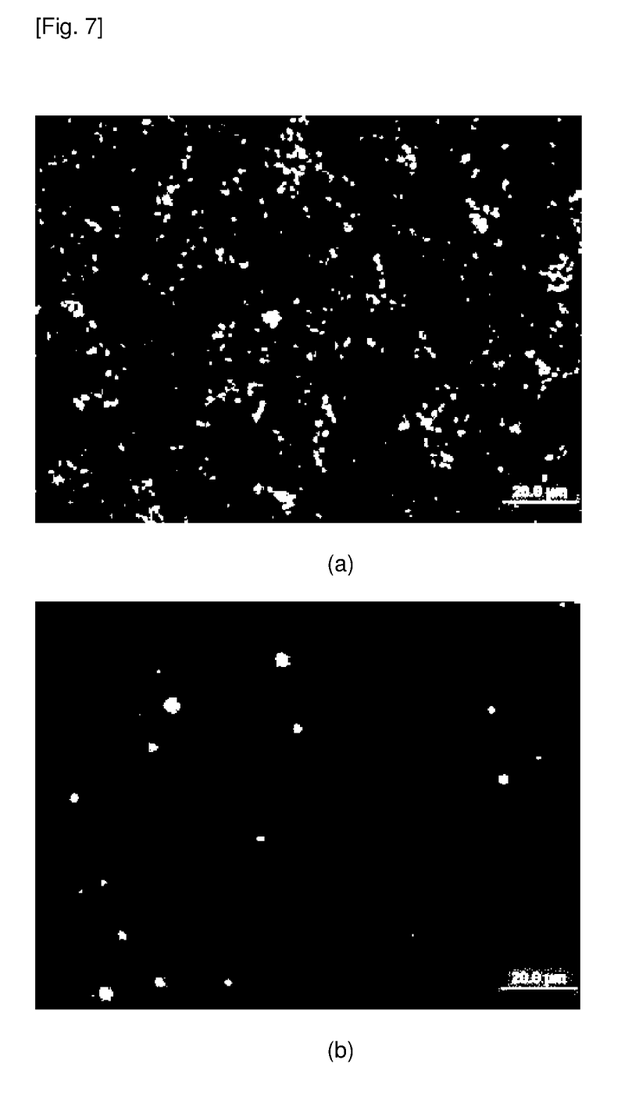
FIG. 7 contains fluorescent microscope images of (a) dead and (b) live *E. coli* on ZnO nanopillars on glass surface.
Figure 8:
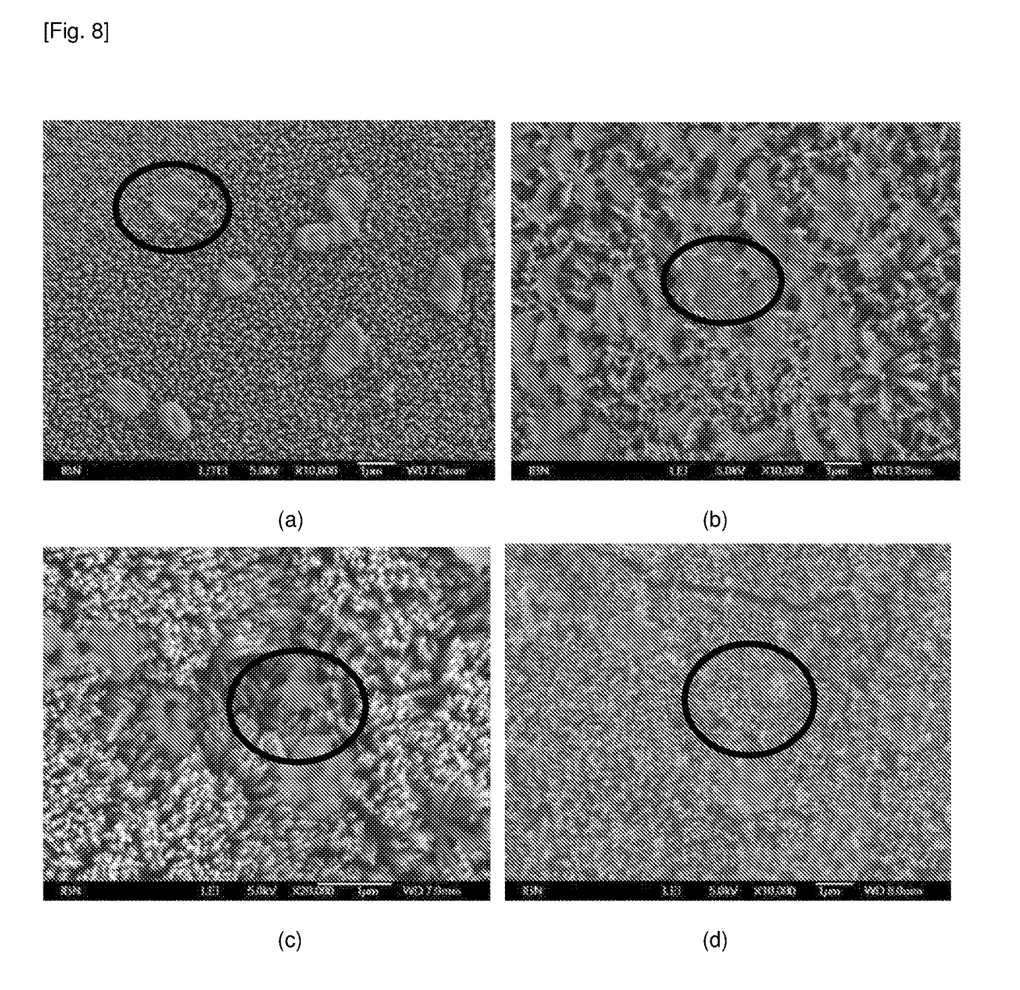
FIG. 8 contains SEM images showing various bacteria/fungus (circled areas) on the surface of ZnO nanopillars on glass: (a) *E. Coli* (EC), (b) *P. aerugirosa* (PA), (c) *S. aureus* (SA), and (d) *C. albicans* (CA).

The surface with $Fe_2O_3$ nanopillars also showed good antibacterial capability. As shown in FIGS. 3a and 3b, all the bacteria on the surface were killed (>99%). The SEM image in FIG. 3c showed the ruptured bacteria cell body.

Example 3—Preparation of ZnO Nanopillars on Various Surfaces

ZnO sol solution preparation: 3.293 g $Zn(OAc)_2 \cdot 2H_2O$ and 1.18 ml of monoethanolamine (MEA) were dissolved in 2-methoxyethanol. The total volume was 20 ml. The solution was stirred at 60° C. for 30 min to yield a clear homogeneous solution. The solution was kept in 4° C. freezer and served as coating solution.

Growth of ZnO nanopillars array on various substrate: the growing substrate (glass, silicon, titanium foil, et al.) were subjected to a standard cleaning process using acetone/IPA/$H_2O$ (1:1:1, v/v) for 10 min each in an ultrasonic bath. After drying, 50 µl of ZnO sol solution was applied onto the surface, spread evenly, and spin coating at 3000 rpm for 20 s, followed by annealing in a furnace at 400° C. for 1 h. To grow ZnO nanopillars on the surface, 70 ml growing solution in water containing 20 mM zinc nitrate (0.366 g $Zn(NO_3)_2 \cdot 4H_2O$), 20 mM hexamethylenetetramine (0.196 g), and 125 mM 1,3-diaminopropane (0.73 ml) was mixed and transferred to a 100 ml KIMAX® glass bottle. The substrate was vertically aligned in the bottle against the wall, hydrothermal at 90° C. for 12 h. After reaction, the slides with ZnO nanopillars arrays was rinsed with DI water and annealed at 500° C. for 1 h to remove any residual organics.

Substrates (i.e., glass, ceramics, silicon wafer, stainless steel and titanium foil) were first coated with a layer of ZnO sol, followed by heating to a temperature of about 400° C. In this way, a ZnO seed coating was formed. Following, the surface was placed in a reactor containing $Zn(NO_3)_2$, hexamethylenetetramine and 1,3-diaminopropane. The solution was heated to 90° C. for a period of time ranging from 2-20 h and ZnO nanopillars array were formed on the surface. The surface was further heated at 500° C. to remove all organic residues.

Figure 9:
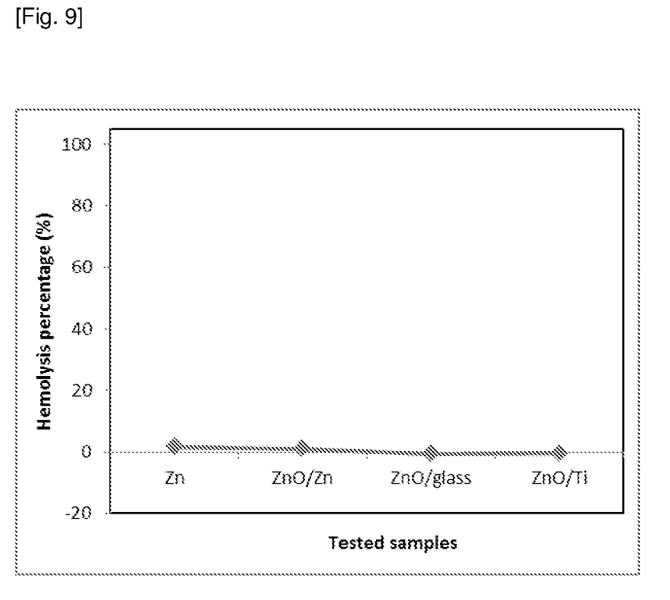
FIG. 9 shows a graph illustrating the hemolysis test results of rabbit red blood cells on the surface of ZnO nanopillars on various surfaces.
Figure 10:
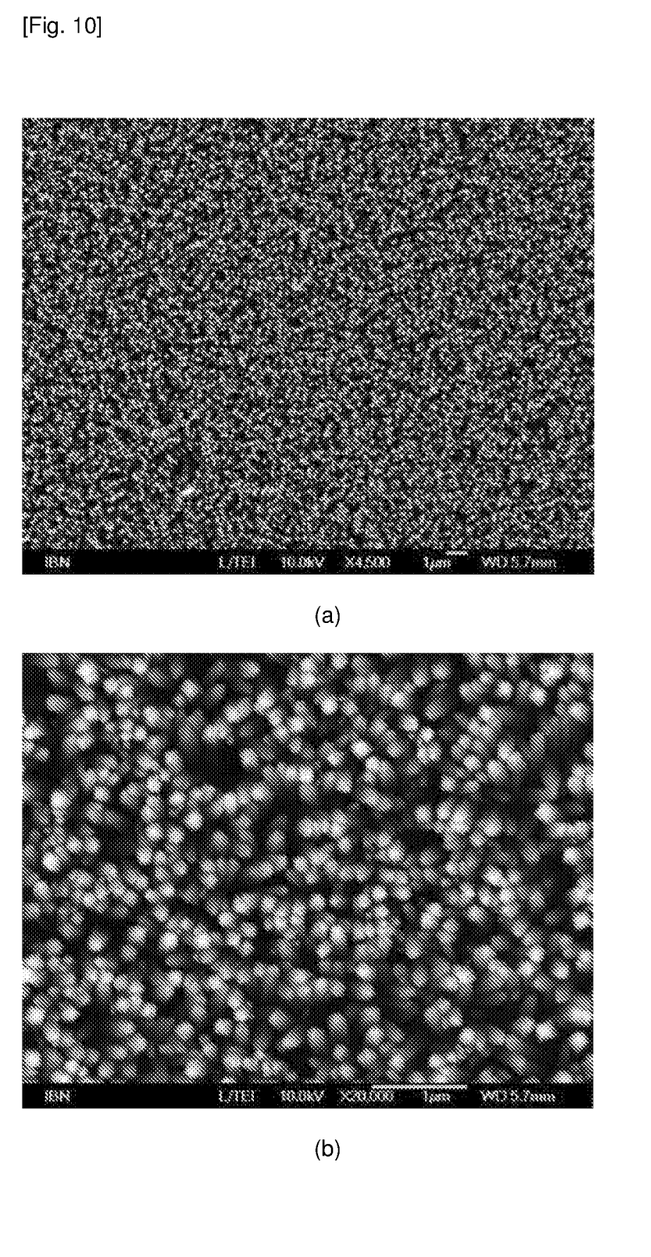
FIG. 10 contains SEM images showing $TiO_2$ nanopillars on FTO glass surface.
Figure 11:
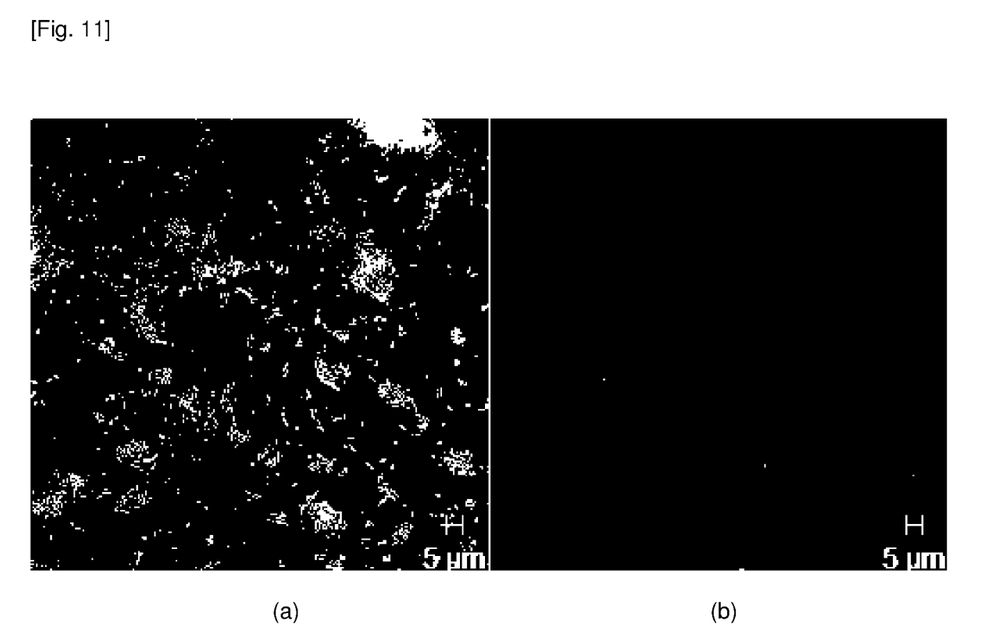
FIG. 11 shows a LIVE/DEAD assay indicating that 82% of P.A. on $TiO_2$ nanopillars was dead: (a) dead cells and (b) live cells.

To test whether these surfaces are safe to mammalian cells, hemolysis experiments have been carried out. As shown in FIG. 9, no obvious rabbit red blood cells were destructed for all the tested surfaces.

Example 4—Preparation of $TiO_2$ Nanopillars on FTO Surface (Fluorine Doped Tin Oxide Surface)

Hydrochloric acid was put inside a Teflon-lined stainless steel autoclave and 1 mL of titanium butoxide was added. The FTO substrate was placed facing at an angle against the wall of the Teflon-liner with the conducting side facing down. The hydrothermal synthesis was conducted at 80-220° C. for 1-24 h in an electric oven. Following the heating, the substrate was taken out and rinsed extensively with deionized water and dried in ambient air.

Bacterial Sample Preparation and Growth Conditions

*E. Coli* (EC), *P. aerugirosa* (PA), *S. aureus* (SA), and *C. albicans* (CA) were obtained from American Type Culture Collection. Prior to each bacterial experiment, bacterial cultures were refreshed ion nutrient agar from stock. Fresh bacterial suspensions were grown overnight at 37° C. in 5 ml of TSB (*E. Coli, P. aerugirosa* and *S. aureus*) or 5 ml M broth (*C. albicans*). Bacterial cells were collected at the logarithmic stage of growth and the suspensions were adjusted to $OD_{600}$=0.07. (TSB: trypticase soy broth; YM broth: yeast malt broth; OD: optical density)

Live/Dead Assay

The bacterial concentration in TSB was adjusted to an OD reading of 0.2 at a wavelength of 600 nm on a microplate rader (TECAN, Switzerland). 500 µl of the suspension was added to the nanopillar surface. Following incubation at 37° C. for 24 h, the surfaces were washed with PBS. To visualise the viable bacterial cells on the nanopillar surfaces, a LIVE/DEAD Baclight bacterial viability kit (Invitrogen) was used. The surface was soaked in 50 µl dye solution at room temperature in the dark for 15 minutes. The stained bacteria were observed using fluorescence microscopy (Zeiss, Germany).

Characterization of the Surfaces by Scanning Electron Microscopy (SEM) and X-Ray Diffraction (XRD)

The surface structures were characterized by SEM [JEOL JSM-7400E] and XRD [PANalytical X-ray diffractometer, X'pert PRO, with Cu Kα radiation at 1.5406 Å]. Prior to SEM, the samples were coated with thin Pt film using high resolution sputter coater (JEOL, JFC-1600 Auto Fine Coater). Coating conditions: 20 mA, 30 s.

EC, PA, SA and CA were selected for the bacteria adhesion study. The study concentration in TSB (YM for CA) was adjusted to an $OD_{600}$=0.07 on a microplate reader (TECA, Switzerland) which corresponds to ~$10^8$ CFU/ml. After $10^2$ times dilution, 500 µl of suspension of the bacteria ($10^6$ CFU/ml) was added to the nanopillar surface in a 24-well plate. After incubation at 37° C. for 24 h, the surfaces were washed 3 times with phosphate-buffered saline solution, PBS, and the samples treated with 2.5% glutaraldehyde (in PBS) for 2 h at room temperature. Following, the samples are soaked in 30%, 50%, 70%, 85%, 90% ethanol, and 100% ethanol twice for a duration of 20 minutes each. Let the samples stay for 2 days before performing SEM studies.

INDUSTRIAL APPLICABILITY

The potential industrial applications of the disclosed antimicrobial coating on a surface and the method of preparation thereof are self-evident. The disclosed antimicrobial surface could be integrated into materials that can be useful in the medical or healthcare industry. The surface covered with an antimicrobial layer can also be used in the production of air filters, water disinfection products and other general disinfecting products. The disclosed method of the present application is simple and could produce the disclosed antimicrobial surface at low-cost.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A process for preparing an antimicrobial coating on a surface, the process comprising:

a) providing a surface;
b) forming a seed coating of a metal oxide on the surface, comprising the step of coating a metal oxide sol on the surface, and wherein the metal oxide sol comprises a metal salt of the metal oxide, an organic base and a solvent;
c) coating the metal oxide or a metal hydroxide on the seed coating on the surface in the presence of a solvent in a hydrothermal synthesis operation to form a coated surface having a plurality of nanostructures, wherein the nanostructures are nanopillars; and
d) optionally drying the coated surface.

2. The process of claim 1, wherein the surface is selected from the group comprising a glass, a polymer, a plastic, a ceramic, a silicon wafer, or a metal.

3. The process of claim 1, wherein the surface is washed with a solvent selected from the group comprising isopropanol, water, acetone, or any of the mixture thereof, prior to coating a metal oxide or metal hydroxide on the surface.

4. The process of claim 1, wherein the solvent used in the hydrothermal synthesis step is water.

5. The process of claim 1, wherein the metal oxide is an oxide of a transition metal or wherein the metal oxide is selected from the group comprising ZnO, $TiO_2$, $Fe_2O_3$, $Ag_2O$, CuO, NiO, $Au_2O_3$, and $MnO_2$.

6. The process of claim 1, wherein the metal hydroxide is a hydroxide of a transition metal.

7. The process of claim 1, wherein the metal hydroxide coating on the surface is converted to a metal oxide in the drying operation or
wherein the drying operation comprises heating in air at a temperature between 300° C. and 1000° C.

8. The process of claim 7, wherein the temperature is between 400° C. and 900° C.

9. The process of claim 7, wherein the temperature is between 500° C. and 800° C.

10. The process of claim 1, wherein the forming operation (b) further comprises drying the metal oxide sol coating on the surface by heating at a temperature of 200° C., at a temperature of 300° C., or at a temperature of 400° C.

11. The process of claim 1, wherein the preparation of the surface coated with the metal oxide sol comprises an operation of placing the surface in a solution containing the metal oxide.

12. The process of claim 1, wherein the hydrothermal synthesis operation is carried out between 50° C. and 300° C.

13. The process of claim 12, wherein the hydrothermal synthesis operation is carried out between 80° C. and 220° C.

14. The process of claim 12, wherein the hydrothermal synthesis operation is carried out between 100° C. and 120° C.

15. The process of claim 1, wherein the coated surface after the hydrothermal synthesis operation is rinsed with deionized water before drying.

16. The process of claim 1, wherein the drying of the coated surface can be carried out under ambient conditions.

17. The process of claim 1, wherein the process further comprises an operation of heating the coated surface, said heating operation being carried out between 300° C. and 1000° C.

18. The process of claim 17, wherein said heating operation is carried out between 400° C. and 900° C.

19. The process of claim 17, wherein said heating operation is carried out between 500° C. and 800° C.

20. The process of claim 1, wherein the thickness of the layer of metal oxide is between 1 nm to 10000 nm.

21. The process of claim 20, wherein the thickness of the layer of metal oxide is between 100 nm to 800 nm.

22. The process of claim 20, wherein the thickness of the layer of metal oxide is between 150 nm to 600 nm.

23. The process of claim 20, wherein the thickness of the layer of metal oxide is between 200 nm to 500 nm.

24. The process of claim 1, wherein the hydrothermal synthesis operation is performed in a reaction time of between 1 hour to 24 hours.

25. The process of claim 24, wherein the reaction time is between 2 hour to 21 hours.

26. The process of claim 24, wherein the reaction time is between 3 hour to 18 hours.

27. The process of claim 1, wherein the forming operation (b) further comprises drying the metal oxide sol coating on the surface by heating at a temperature in the range of between 200° C. and 400° C.

28. The process of claim 1, wherein the nanostructures extend 1 nm to 10000 nm from the surface.

29. The process of claim 1, wherein the nanostructures extend between 100 nm to 800 nm from the surface.

30. The process of claim 1, wherein the nanostructures extend between 150 nm to 600 nm from the surface.

31. The process of claim 1, wherein the nanostructures extend between 200 nm to 500 nm from the surface.

\* \* \* \* \*